(12) United States Patent
Bourbonnais et al.

(10) Patent No.: US 10,255,343 B2
(45) Date of Patent: *Apr. 9, 2019

(54) INITIALIZATION PROTOCOL FOR A PEER-TO-PEER REPLICATION ENVIRONMENT

(71) Applicant: International Business Machines Corporation, Armonk, NY (US)

(72) Inventors: Serge Bourbonnais, Palo Alto, CA (US); Somil Kulkarni, San Jose, CA (US); Yat O. Lau, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 338 days.

This patent is subject to a terminal disclaimer.

(21) Appl. No.: 15/299,314

(22) Filed: Oct. 20, 2016

(65) Prior Publication Data

US 2017/0039261 A1 Feb. 9, 2017

Related U.S. Application Data

(63) Continuation of application No. 13/553,372, filed on Jul. 19, 2012, now Pat. No. 9,483,541, which is a continuation of application No. 12/986,049, filed on Jan. 6, 2011, now Pat. No. 9,477,738.

(60) Provisional application No. 61/366,489, filed on Jul. 21, 2010.

(51) Int. Cl.
G06F 17/30 (2006.01)
G06F 11/14 (2006.01)

(52) U.S. Cl.
CPC .... *G06F 17/30578* (2013.01); *G06F 11/1451* (2013.01); *G06F 11/1464* (2013.01); *G06F 17/30566* (2013.01); *G06F 2201/80* (2013.01)

(58) Field of Classification Search
CPC ................. G06F 17/30578; G06F 17/30575
See application file for complete search history.

(56) References Cited

U.S. PATENT DOCUMENTS

| 7,203,687 B2 | 4/2007 | Adiba et al. |
| 7,330,860 B2 | 2/2008 | Adiba et al. |
| 2005/0193024 A1 | 9/2005 | Beyer et al. |

(Continued)

OTHER PUBLICATIONS

Conway, Neil et al., A Proposal for a Multi-Master Synchronous Replication System, Technical Report on Slony II, Jan. 12, 2006, <http://www.neilconway.org/>.

*Primary Examiner* — Apu M Mofiz
*Assistant Examiner* — Sheryl L Holland
(74) *Attorney, Agent, or Firm* — Patterson + Sheridan, LLP (57) ABSTRACT

Techniques for initializing a connection in a peer-to-peer replication environment. Responsive to a request to add a target node to a data replication group, embodiments receive a first message, at a target node, from an initiator node within the data replication group, indicating that the initiator node will begin replicating changes to the target node without waiting for any acknowledgements relating to the first message. The changes are applied to a first instance of a data entity on the initiator node. A second message is transmitted, from the target node, to at least one other member in the data replication group, announcing that the target node is joining the data replication group. Embodiments receive a plurality of replicated changes, at the target node, from the initiator node, and process each replicated change in the plurality of replicated changes against a second instance of the data entity at the target node.

18 Claims, 6 Drawing Sheets

(56) References Cited

U.S. PATENT DOCUMENTS

2005/0193037 A1  9/2005  Adiba et al.
2009/0271412 A1  10/2009  Lacapra et al.
2012/0023066 A1  1/2012  Bourbonnais et al.
2012/0284227 A1  11/2012  Bourbonnais et al.

INITIALIZATION PROTOCOL FOR A PEER-TO-PEER REPLICATION ENVIRONMENT

CROSS-REFERENCE TO RELATED APPLICATION

This application is a continuation of co-pending U.S. patent application Ser. No. 13/553,372, filed on Jul. 19, 2012 which is a continuation of Ser. No. 12/986,049, filed Jan. 6, 2011, which claims benefit of U.S. Provisional Patent Application Ser. No. 61/366,489 filed Jul. 21, 2010. Each of the aforementioned related patent applications are herein incorporated by reference in its entirety.

BACKGROUND

The present invention relates to database systems and more particularly to the asynchronous replication of data in database systems.

Data replication in relational or hierarchical databases is increasingly important as databases are deployed more and more in distributed environments. The goal of data replication is to maintain one or more copies of a source object in the database across servers, possibly on different platforms and geographical locations. One method of data replication is log-based asynchronous replication. A database log records all changes to the tables in the database. Changes are captured from the database log outside of a commit scope of the original database transaction.

Before asynchronous replication of data can begin, the replication group of member nodes may first be initialized. Also, once the replication has begun, new members may be added to the replication group, or an existing member may be removed from the replication group. Additionally, since the new members may not have an updated copy of the tables being synchronized, these tables may be synchronized on the new node before the new node joins the replication group. Furthermore, existing protocols may require the new node to receive acknowledgements, either itself or through a proxy, from all the other nodes in the replication group before any changes will be replicated to the new node. While the tables on the new node are being synchronized, and while the new node waits for acknowledgements, the tables may not be available for processing user workloads. This may be disadvantageous, however, because suspending user workloads for any period of time, even a few seconds, is often unacceptable for many businesses.

SUMMARY

Embodiments provide a method, system and computer-readable storage medium for initializing a connection in a peer-to-peer replication environment. The method, system and computer-readable storage medium include, responsive to a request to add a target node to a data replication group, receiving a first message, at a target node, from an initiator node within the data replication group, indicating that the initiator node will begin replicating changes to the target node without waiting for any acknowledgements relating to the first message, where the changes are applied to a first instance of a data entity on the initiator node. Additionally, the method, system and computer-readable storage medium include, upon receiving the first message indicating that the initiator node will begin replicating changes, transmitting a second message, from the target node, to at least one other member in the data replication group, announcing that the target node is joining the data replication group. The method, system and computer-readable storage medium also include receiving a plurality of replicated changes, at the target node, from the initiator node, and the method, system and computer-readable storage medium include processing each received replicated change in the plurality of replicated changes against a second instance of the data entity at the target node.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Distributed database systems may maintain multiple synchronized copies of database entities (e.g., tables) on a plurality of database nodes. For example, a database system may include a plurality of nodes, with each node being a "member" of a replication group. In such an example, a copy of a particular database table may be kept at each of these nodes. These copies of the database table may then be synchronized with one another, such that if a change is made to an instance of the table on a first node, the change is then replicated to all the other nodes in the replication group. By doing this, each instance of the database table may be kept in sync with all the other instances of the table.

The propagation of changes made to one table copy may be synchronous or asynchronous to the original change. With synchronous change propagation, changes are made at all instances of the table as part of the same transaction that initiated the original changes. Synchronous change propagation requires that the database management systems maintaining all or most table copies be active and available at the time of the change. Also, synchronous change propagation introduces substantial messaging and synchronization costs at the time of the original changes. Asynchronous change propagation, on the other hand, copies the original changes to the other instances of the table in separate transactions, subsequent to the completion of the transaction initiating the original changes. As such, asynchronous change propagation may be more desirable in certain circumstances, due to its savings in overhead costs.

Embodiments of the invention are directed to an initialization protocol for use in peer-to-peer replication. Particular embodiments of the invention provide an initialization protocol which minimizes any delay before changes to a database construct to be synchronized are replicated to a target node joining a peer-to-peer system. According to embodiments of the invention, other nodes may be configured to begin replicating changes to the database construct to the target node, even before the target node has loaded an updated copy of the database construct. Upon receiving the replicated database changes, the target node may store the received changes in a spill queue if the target node does not contain an updated copy of the database construct, and the target node may perform load operations to obtain an updated copy of the database construct. Such load operations may include, without limitation, receiving an updated copy of the database construct from one of the other nodes, and using an external loading tool to perform the load operation. Once the target node has an updated copy of the database construct, the target node may process all of the received changes against the updated database construct.

Advantageously, by doing this, the instance of the database construct on the target node may be brought into a database replication group in a way that eliminates any window during which changes are not captured. For example, a table against which a workload is currently being performed may be added to the replication configuration, and thus synchronized across the members of the replication group, without the need to suspend the workload or the replication process for any period of time. Changes associated with the workload may even be captured, even if the replication process is not running at one or more of the other member nodes. By doing this, embodiments of the invention minimize any downtime or delay involved in initiating a new member to the replication group.

In one embodiment, each node may include a Capture program ("Capture") and an Apply program ("Apply"). The Capture and the Apply each maintain control tables at the node. Control tables are database tables used to store all replication information persistently. The control tables may then be read and updated by Capture and Apply. The node at which changes are made may be referred to as the source node. The node the changes are replicated to may be referred to as the target node. In one embodiment, message queues are used for transporting messages between the nodes of the replication group.

During the replication process, Capture may read the database log for committed changes at the source node. The database log contains the source table and row that was changed, the type of operation, the column data type information, the data value after the change for insert and update operations, and the data value before the change for delete and update operations. These changes may then be formatted into messages and sent to the message queues at the target node. Upon delivery to the message queue, Apply (at the target node) may retrieve the messages and apply the changes to the target table. By doing this, changes to the database table may be initiated at any instance of the table, and then synchronized to all the other instances of the table.

This type of replication has been variously called "multi-master," "peer-to-peer" and "update anywhere" data replication.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the present invention, a user may create a new node for peer-to-peer replication in the cloud. For example, the each node in the peer-to-peer system could execute on a computing system in the cloud. In such a case, the new node joining the peer-to-peer system could receive replicated changes from an initiator node in the peer-to-peer system and could process the replicated changes, after the new node synchronizes its copy of a database table. Doing so allows a user to access the updated database information from any computing system attached to a network connected to the cloud (e.g., the Internet).

Figure 1:
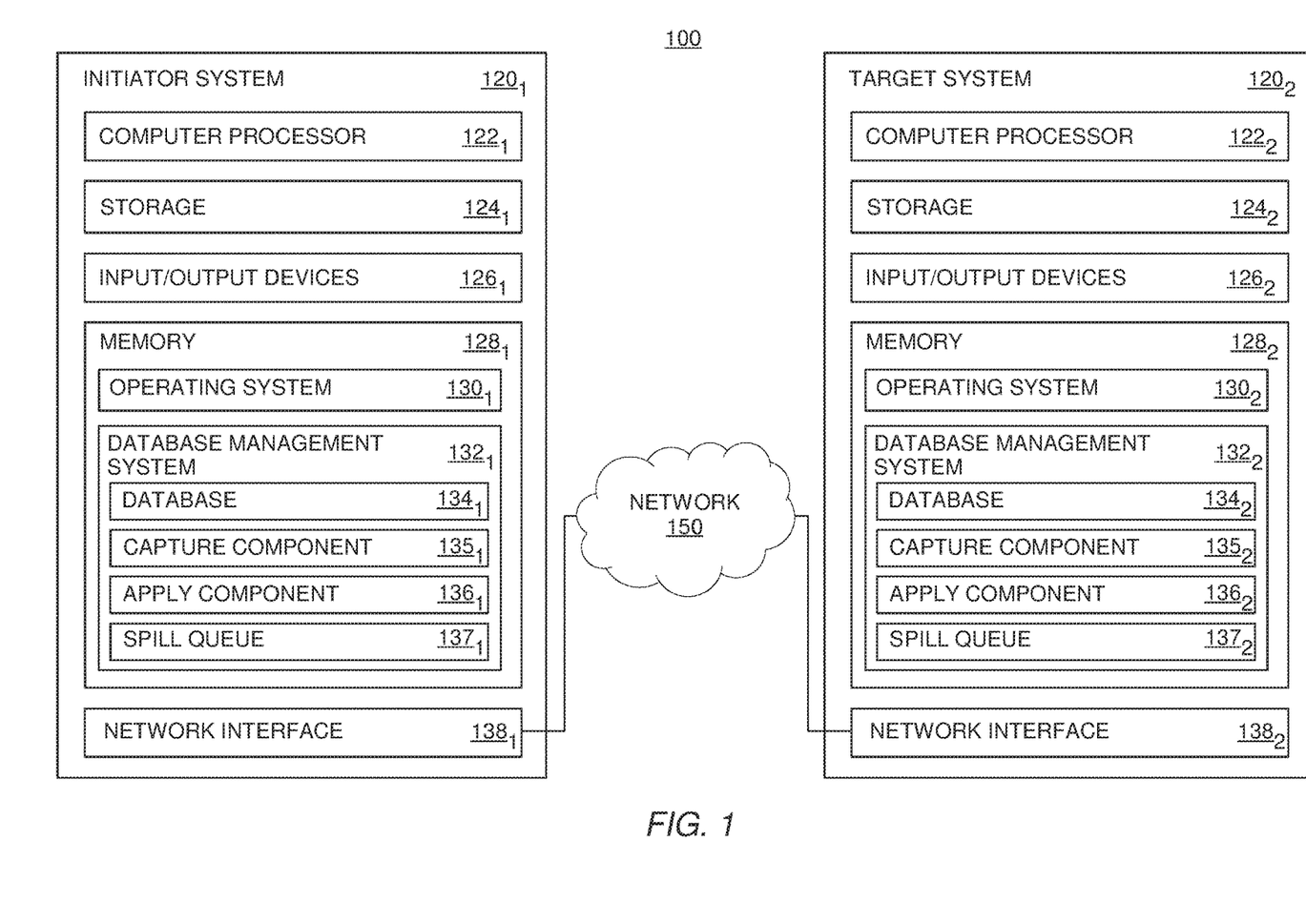
FIG. 1 is a block diagram illustrating a networked computer system, according to one embodiment of the invention.

FIG. 1 is a block diagram illustrating a networked computer system, according to one embodiment of the invention. As shown, the system 100 includes an initiator system 120₁ and a target system 120₂, connect via a network 150. Both initiator systems 120₁ and 120₂ contain a computer processor 122, storage media 124, memory 128 and a network interface 138. Computer processor 122 may be any processor capable of performing the functions described herein. The systems 120₁ and 120₂ may connect to the network 150 and communicate with each other, as well as other entities, using their respective network interface 138. Furthermore, as will be understood by one of ordinary skill in the art, any computer system capable of performing the functions described herein may be used.

In the pictured embodiment, memory 128 contains an operating system 130 and a database management system 132 (hereinafter "DBMS"). The DBMS 132 contains an instance of a database 134, a capture component 135 (also referred to herein as "Capture"), an apply component 136 (also referred to herein as "Apply") and a spill queue 137. Although memory 128 is shown as a single entity, memory 128 may include one or more memory devices having blocks of memory associated with physical addresses, such as random access memory (RAM), read only memory (ROM), flash memory or other types of volatile and/or non-volatile memory. The operating system 130 may be any operating system capable of performing the functions described herein.

Generally, the initiator system 120₁ may act as a liaison between a data replication group (of which the initiator system 120₁ is a member) and the target system 120₂, and may perform actions to bring the target system 120₂ into the group. Initially, a user may indicate to the initiator system 120₁ that the target system 120₂ should be brought into the data replication group (e.g., using I/O devices 126₁). Upon receiving such a message, the capture component 135₁ may transmit a message to the apply component 136₂, indicating that the target system 120₂ will be brought into the replication group and that the initiator system 120₁ will immediately begin replicating changes to the target system 120₂.

The message may further indicate one or more database constructs to be synchronized. For example, the message may indicate that the entirety of database 134 should be synchronized, meaning that any change to any part of the database 134 on any member of the data replication group will be replicated to all the other members of the group. As a second example, the message may indicate that a particular table or field within the database 134 should be synchronized. For purposes of the rest of this example, however, assume that the database construct to be synchronized is a particular database table. Accordingly, upon transmitting the message, the capture component $135_1$ on the initiator system $120_1$ will begin transmitting any changes to the database table to the target system $120_1$. For example, if a particular value stored within the database table is modified by a workload is being performed by the DBMS $132_1$ on the initiator system $120_1$, the capture component $135_1$ may transmit the database operation that modified the value to the target system $120_2$, so that the database operation may be performed against the instance of the database table on the target system $120_2$ to ensure that both instances of the database table are synchronized.

Upon receiving the replicated changes, the apply component $136_2$ on the target system $120_2$ may store the changes in the spill queue $137_2$. The capture component $135_2$ on the target system $120_2$ may then announce its membership to each of the other members of the data replication group. For example, the capture component $135_2$ may transmit a message to each of the other members, indicating that the other member should begin replicating changes to the database table to be synchronized. Upon receiving such a message, the other members may immediately begin replicating any changes to the database table to the target system $120_2$.

In some situations, the target system $120_2$ may not contain an up-to-date copy of the database table to be synchronized when the message from the initiator system $120_1$ is first received. In such a situation, the apply component $136_2$ on the target system $120_2$ may perform a load operation on the database table. In one embodiment, the load operation is performed by requesting an up-to-date copy of the database table from the initiator system $120_1$. In another embodiment, the load operation is performed using an external tool to update the database table. Such an external tool may involve one or more manual operations performed by a user. In any event, while the load operation is performed, the apply component $136_2$ on the target system $120_2$ may store any received replicated changes in the spill queue $137_2$. Of course, in the event the target system $120_2$ already contains an up-to-date copy of the database table, the apply component $136_2$ may forgo storing the received changes and may directly apply the received replicated changes to the database table.

Once the load operation is complete, and once all members of the data replication group have been notified of the new member, the apply component $137_2$ on the target system $120_2$ may process all of the replicated changes in the spill queue $137_2$. By doing this, the apply component $137_2$ may account for any modifications to other instances of the database table that were made by workloads running on the other members of the replication group while the load operation was being performed. Once all replicated changes are processed, the database table on the target system $120_2$ is synchronized and the initiation of the target system $120_2$ to the data replication group is complete. Accordingly, the DBMS $132_2$ on the target system $120_2$ may begin performing normal data replication operations.

By doing this, embodiments of the invention may bring a new member into a data replication group without interrupting any workloads being processed by members of the group. Rather, such workloads may continue processing, and any relevant changes made by processing the workloads may be replicated to the new member to the group (e.g., the target system $120_2$). In the event the new member is not yet ready to process such replicated changes (e.g., if a load operation is underway), the new member may store the received changes in a spill queue 137 for later processing. Advantageously, because no replicated changes are lost and no workloads are interrupted during new member initiation, embodiments of the invention provide an improved initiation process which eliminates any window of interruption or downtime caused by new member initiation in the data replication environment.

Figure 2:
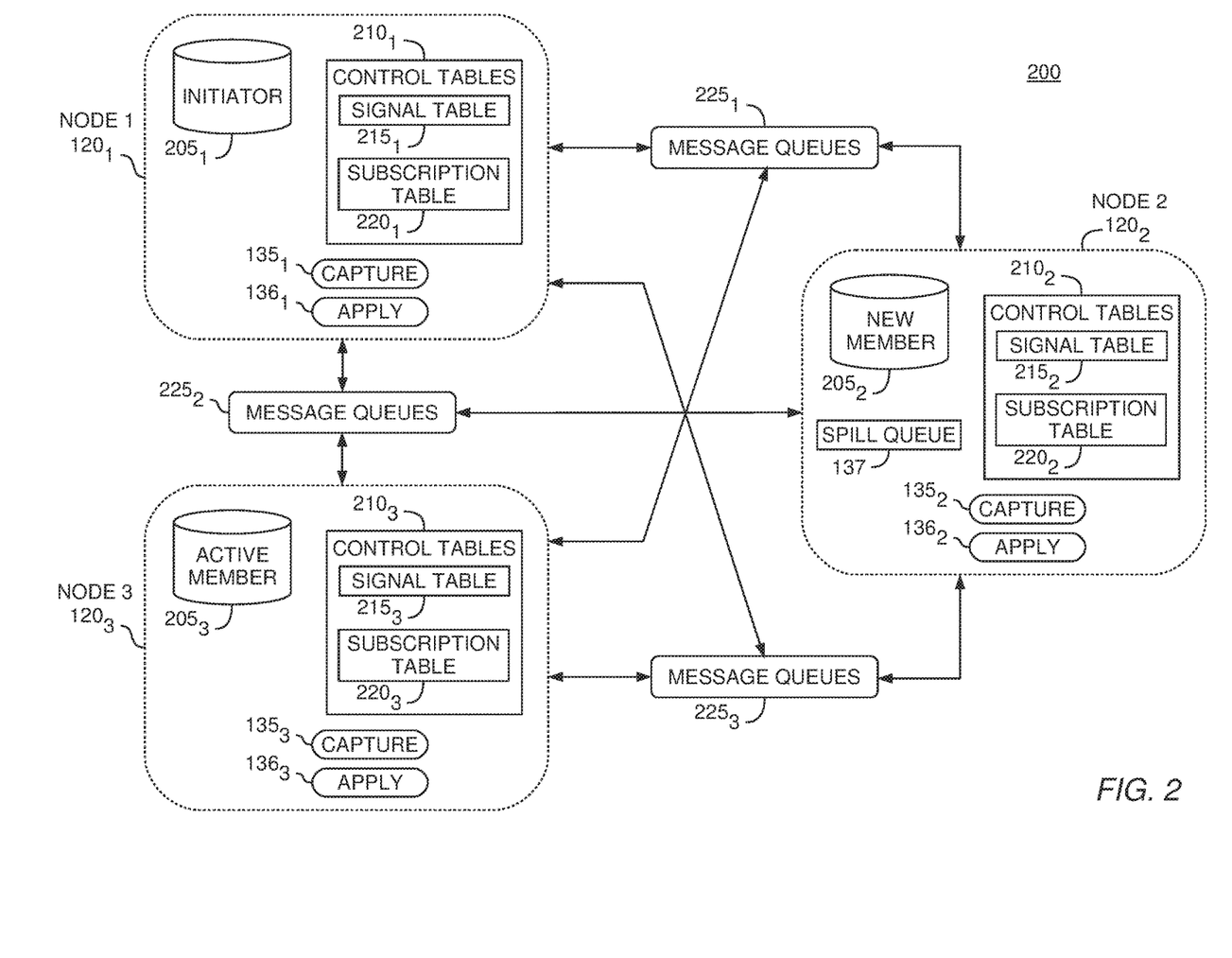
FIG. 2 illustrates an embodiment of a database system that initializes new members and deactivates existing members from an asynchronous data replication group, according to one embodiment of the invention.

FIG. 2 illustrates an embodiment of a database system that initializes new members from an asynchronous data replication group, according to one embodiment of the present invention. As shown, the system 200 includes three nodes 120. Assume for the purposes of this example, the three nodes 120 are configured to synchronize instances of a particular database table 250. In this example, the instance of the table $205_1$ on node 1 $120_1$ is assigned the role of the initiator. The instance of the table $205_2$ on node 2 $120_2$, which represents the instance to be added to the group, is the new member. Likewise, the instance of the table $205_3$ on node 3 $120_3$, as well as any other members of the replication group, are referred to as the active members of the group.

Generally, members of a group may operate to synchronize a particular database construct between the members in the group. For example, in an embodiment where the database construct is a particular table, each of the members may contain a synchronized instance of the table. If one of the members then makes a modification to their respective instance of the table, such a modification may then be synchronized to all of the other members of the group. In this way, the various instances of the table may be kept in sync with one another. Of course, such an example is for illustrative purposes only, and one of ordinary skill in the art will recognize that embodiments may be used with other database constructs or other types of data stores altogether.

At each member node is a Capture program 135 ("Capture"), an Apply program 136 ("Apply"), and a set of control tables 210. The control tables 210 comprise a signal table 215 and a subscription table 220. The control tables 210 may contain many other tables as well. The signal table 215 is used for user operations. For instance, a user may insert signals into the signal table 215 to control replication activities for the respective node 120. In such a scenario, Capture 135 retrieves the signal from the signal table 215 and performs the corresponding actions. As a result, a control message is sent to a message queue to notify Apply 136 at a target node 120 about the operation. The message is then transmitted to a message queue 225 at the target node. When Apply 136 retrieves the message from Capture 135, it will in turn perform appropriate actions on its subscriptions, tables or queues, in order to complete the requested operation. In one embodiment, this is the primary mechanism for Capture 135 and Apply 136 to communicate.

A "subscription" is a mapping of a source table to a target table using a send queue and a receive queue. A send queue is a queue on the source node used by Capture 135 to publish transactions that it has captured. A receive queue is a queue on the target node used by Apply 136 to receive transactions from Capture 135. Capture 135 may write transactions from the source table onto the send queue in the form of messages. The written transactions may then be transmitted by a queue manager (not shown) to the receive queue on the target node. Apply 136 may then retrieve the messages and apply the changes to the target table. Generally, such subscriptions are defined in the subscription table 220 of the control tables. In one embodiment, there is a subscription ID associated with each subscription. Since there are numerous components involved, replication should ideally be fault tolerant and be able to recover from error. This is particularly true in peer-to-peer replication where the configuration is more complex. The approach used in this embodiment is to associate a state with a subscription.

When a subscription state changes, Capture 135 may send a corresponding control message to inform Apply 136. Apply 136 may then act accordingly to the change. Table 1 below illustrates the subscription states used in Capture 135 in one embodiment of the present invention.

TABLE 1

Subscription States in Capture

| State | Description |
| --- | --- |
| I (Inactive) | Subscription is inactive |
| L (Loading) | Base table for this subscription is being loaded |
| A (Active) | Subscription is active, changes to the base table are being captured and sent |
| T (P2PINIT) | Peer-to-peer subscription is being initialized |
| G (P2PSUBSTOPPING) | Peer-to-peer subscription is being deactivated |

Similarly, Table 2 below illustrates the subscription states used in Apply 136 in one embodiment of the present invention.

TABLE 2

Subscription States in Apply

| State | Description |
| --- | --- |
| I (Inactive) | Subscription is inactive |
| L (Internal Loading) | Subscription is being loaded internally |
| E (External Loading) | Subscription is being loaded externally |
| D | Subscription has finished invoking the specified load utility and is ready to send LOADDONE message to Capture (internal loading only) |
| F (FinalCatchUp) | Subscription is now applying changes from the spill queue |
| T (Terminating) | Subscription is terminating because of an error |
| A (Active) | Subscription is active, changes are being applied |
| W (Waiting) | Subscription is spilling changes while waiting to begin load operation |

In accordance with the present invention, while a member is being initialized, replication activities are not interrupted among the other members in order to attain and ensure convergence of all table copies to the same state. In such a situation, other members in the replication group may continue transmitting replicated changes to the new member. The new member may then store received replicated changes in a spill queue until the new member is ready to process the replicated changes (e.g., once the new member loads an updated copy of a database table to process the changes against). In one embodiment, the other members of the group may perform validation operations on subscription attributes and compatibilities in order to detect any erroneous activity.

Figure 3:
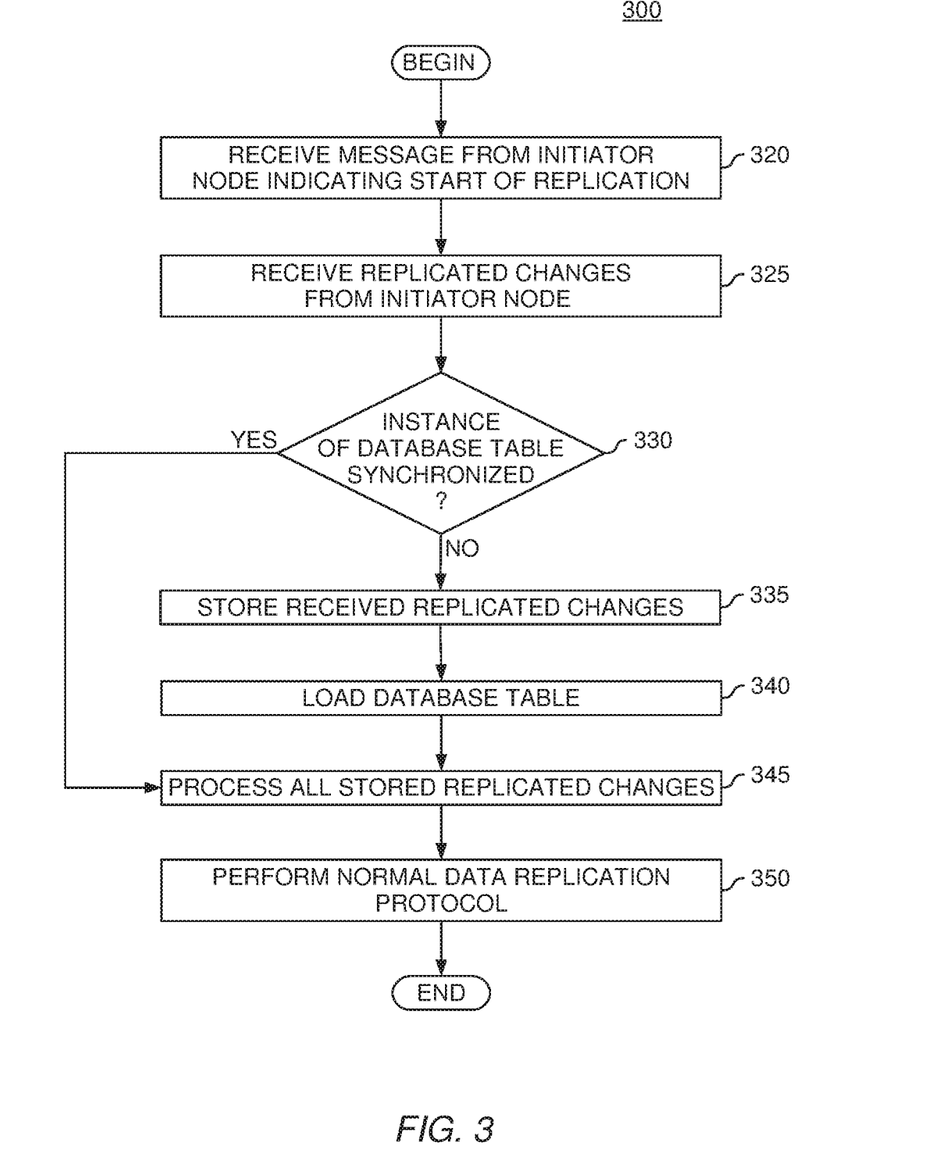
FIG. 3 is a flowchart illustrating a method for initializing a member of an asynchronous data replication group in a database system, according to one embodiment of the present invention.

FIG. 3 is a flowchart illustrating an embodiment of a method for initializing a member of an asynchronous data replication group in a database system in accordance with the present invention. Referring to both FIGS. 2 and 3, first, a subscription for a new member 208 is initiated at an initiator 201, via step 301. The initiator 201 is an active member in the replication group. The initiator 201 then sends to the new member 208 a list of the active members in the replication group, via step 302. Next, the new member 208 sends its subscription information to each active member 216 in the replication group, via step 303. Each active member 216 validates a subscription to the new member 208 and sends an acknowledgement to the initiator 201 of receipt of the new member's subscription information, via step 304. The initiator 201 tracks the acknowledgements received from active members 216. When the initiator 201 has received acknowledgements from all of the active members in the replication group, via step 305, it is determined if loading of data into the new member 208 is required, via step 306. Loading is required if the initiator 201 is not an empty table but contains data.

If loading is required, the data is loaded from the initiator 201 to the new member 208, via step 307. In this embodiment, any active member in the replication group can be designated as the initiator 201, with loading being performed only from the initiator 201. While the data is being loaded, any current replication messages from the other active members 216 in the replication group is stored in one or more spill queues, via step 308. A spill queue is a queue separate from the receive queue. In this embodiment, a spill queue is created at the new member for each active member in the replication group. Replication messages from the active members 216 are stored in the respective spill queue but not yet applied to the new member 208. Once the loading is done, via step 309, the replication messages in the spill queues are processed, via step 310, i.e., applied to the new member 208. Once the messages in the spill queue are processed, the normal data replication protocol is performed from that point forward, via step 311. The spill queues allow new members to be added to the replication group without requiring the halting of the asynchronous replication of data between the existing members.

During initialization, Capture and Apply running on all nodes in the replication group coordinate with each other in adding a new member node. Capture may send control messages to Apply on another node, while Apply will insert signals for the Capture on the same node. To start replication in a group of more than two members, two of the members may be started first. Then, other members may be added to the group one at a time. Initially, all of the members in a replication group may be in an 'inactive' state. Then, a new member can be added in by assigning one of the active members the role of initiator and initiating the initialization of the new member there.

Table 3 below illustrates the subscription attributes used in this embodiment:

TABLE 3

Subscription Attributes

| Attribute | Description |
| --- | --- |
| subtype | Subscription type (e.g., "P" for Peer-to-Peer") |
| source_node | Node number from which changes are coming from |
| target_node | Node number which changes are going to |
| subgroup | Name of the subscription group that the subscription belongs to |
| group_members | List of active member nodes during initialization |

All subscriptions in a subscription/replication group at a particular node may be defined in the same set of control tables. In such an embodiment, initially, there may be 'inactive' subscriptions for the whole replication group. When Capture 135 receives these signals, it first may validate its subscriptions' attributes in the control tables 210 for consistency. For example, if a received signal indicates that a particular table containing three columns should be synchronized with the other nodes in a group, Capture 135 may verify that its instance of the table also contains the same three columns. Capture may then send control message(s) in response to the signals. For example, one such control message may be a SCHEMA message which informs other members in the group to start the subscription. As a second example, the control message may be a P2PSPOOLING, which may be sent to an initiator node to indicate that the node sending the message is spooling changes to a new node. Another example of a control message is a P2PLOADDONE message, which informs the recipient that a load operation is complete.

When Apply 136 receives these control messages, it may first validate its subscriptions' attributes in the control tables 210 for consistency and deduces its role in the subscription group during initialization. Apply 136 may then insert corresponding signal(s) in the signal table in response to the control messages, if necessary. Furthermore, although one embodiment includes a system configured with both a capture component 135 and apply component 136, other embodiments of the invention may be performed without one or both of these components. More generally, any system capable of performing the functions described herein may be used instead.

FIG. 3 is a flowchart illustrating a method for initializing a member of an asynchronous data replication group in a database system, according to one embodiment of the present invention. As shown, the method 300 begins at step 320, where a target node receives a message from an initiator node. In this example, the message indicates that the initiator node will begin replicating changes to the target node. Such a message may specify one or more database constructs for which changes will be replicated. For this example, assume that the database construct being synchronized is a database table. Furthermore, such a message may also identify other members of the data replication group of which the initiator node is a member and to which the target node is joining.

After receiving the message, the target node receives one or more replicated changes from the initiator node (step 325). Of note, upon sending the message, the initiator node immediately begins replicating changes to the target node, without waiting for any approval and without any window of interruption to workloads executing on the initiator node. As one of ordinary skill in the art will understand, the replicated changes generally are related to the databases or database constructs being synchronized across the data replication group. That is, if a particular database table is synchronized across the replication group, upon sending the initial message to the target node, the initiator node begins replicating any changes to the particular database table to the target node.

Upon receiving the replicated changes, the target node determines whether the instance of the database table on the target node is currently up-to-date (step 330). For example, the database table may not be up to date if it has not been updated for a substantial period of time, during which substantial changes were made to other instances of the database. As a second example, the target node may not contain an instance of the database at all. In either scenario, if the table is not up-to-date, the target node stores the received replicated changes for subsequent processing (step 335). As discussed above, in one embodiment, the target node may store the replicated changes in a spill queue 137. More generally, however, any structure capable of storing the replicated changes may be used instead. The target node then loads an updated instance of the database table (step 340). In one embodiment, the target node may request a copy of the database table from another node in the replication group (e.g., the initiator node). In another embodiment, a user may perform a manual load of the database table on the target node using an external tool.

Once the database table is loaded, or once the target node determines that the existing instance of the database table is already up-to-date, the target node then processes all the replicated changes against the database table (step 345). Of note, the other nodes in the data replication group (e.g., the initiator node) may continue replicating changes up to and until step 345 has completed. That is, if the instance of the database table on the initiator node is modified while the target node is loading the database, the initiator node may replicate the changes to the target node. Upon receiving the replicated changes, the target node may store the changes until the target node is ready to process the changes. Thus, although step 325 in this example shows the target node receiving replicated changes to the database table, such changes may be received at any time between the steps 320 and 345 in the method 300. In any event, once all the stored replicated changes are processed, the target node has successfully been initiated into the data replication group. Accordingly, the target node begins performing its normal data replication protocol (step 350), and the method 300 ends.

Advantageously, the method 300 enables the target node to be initiated into the data replication group without any window of interruption to workloads running on the initiator system. That is, using existing initialization protocols, the initiator node may have to suspend workloads executing against the database table while the initiator node waits on an acknowledgement from the target node, indicating that the target node is ready to receive replicated changes to the database table. Thus, the method 300 is advantageous because the initiator node may bring the target node into the data replication group without any interruption to workloads executing on the initiator node.

Figure 4:
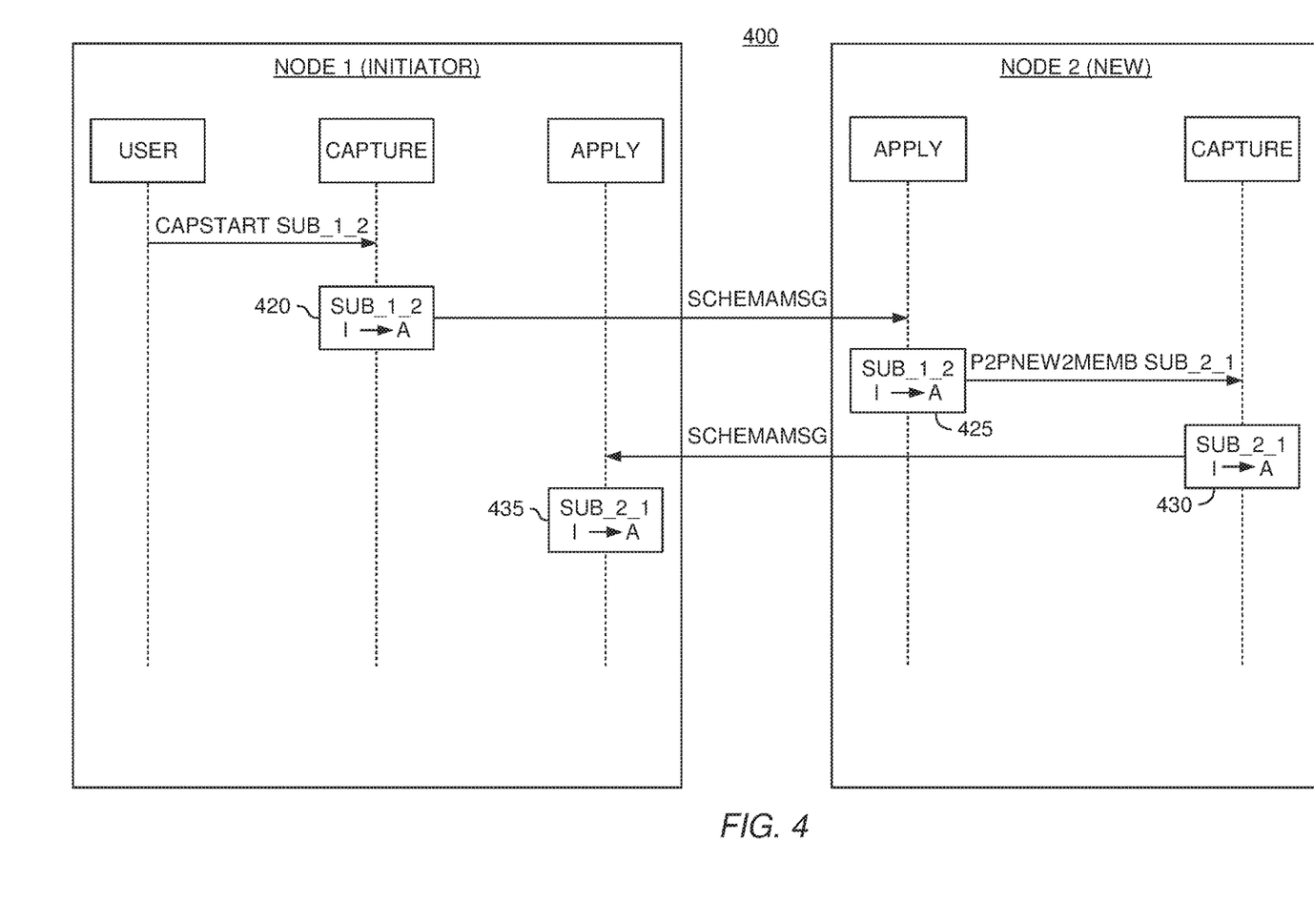
FIG. 4 is a flowchart illustrating a method for initializing a member of an asynchronous data replication group in a database system, according to one embodiment of the present invention.

FIG. 4 is a flowchart illustrating a method for initializing a member of an asynchronous data replication group in a database system, according to one embodiment of the present invention. That is, FIG. 4 illustrates an initialization procedure for an initiator node (Node 1) to bring a new node (Node 2) into a data replication group. As shown, the method 400 begins at step 420, where a user inserts a CAPSTART string into a row in a table monitored by the Capture component of Node 1. Of note, although the depicted method is initiated by inserting a string into a particular control table, such an example is without limitation and is included for illustrative purposes only. More generally, any technique for communicating to an initiator node that a new node should be brought into a data replication group may be used instead.

Returning to the current example, upon detecting the CAPSTART string, the Capture component on Node 1 sends a SCHEMA control message to the Apply component of Node 2. As discussed above, such a message may indicate one or more databases or database constructs that are synchronized across the data replication group. Additionally, after detecting the CAPSTART string, the Capture component of Node 1 transitions from State I to State A (i.e., from INACTIVE to ACTIVE) for the subscription SUB_1_2. That is, the subscription from Node 1 to Node 2 is set to the ACTIVE state, indicating that the Capture component of Node 1 may immediately begin replicating changes in the particular table to the Apply component of Node 2, even before any acknowledgement is received form Node 2. Of course, in an embodiment where the message specifies one or more database constructs to be synchronized, the replicated changes will generally pertain to the synchronized database constructs. That is, if a particular database table is synchronized across the data replication group, Node 1 may replicate any modifications to the particular database table to Node 2.

Upon receiving the SCHEMA message from Node 1 at step 425, the Apply component of Node 2 sends a message to the Capture component of Node 2, notifying the Capture component that Node 1 will begin replicating changes to Node 2. The Apply component may also determine whether Node 2 currently contains an up-to-date copy of the database construct being synchronized. For the purposes of this example, the Apply component has determined that Node 2 contains an updated copy of the database construct. However, in the event that Node 2 does not contain the updated copy of the database construct, the Apply component may perform a load operation at this point to obtain the updated copy. The FIG. 4 below discusses such a scenario in additionally detail.

Upon receiving the SCHEMA message, the Apply component of Node 2 additionally transitions from State I to State A (i.e., from INACTIVE to ACTIVE) for the subscription SUB_1_2, indicating that the Apply component will expect replicated changes from Node 1. As discussed above, in the event the Apply component of Node 2 receives such changes before the changes may be applied (e.g., before Node 2 contains an up-to-date copy of the database construct being synchronized), the Apply component may store the replicated changes to be processed at a later time.

Once the Capture component receives the message, the Capture component transitions the subscription SUB_2_1 from State I to State A (i.e., from INACTIVE to ACTIVE), indicating that changes made to the database construct on Node 2 will be replicated to Node 1 (step 430). Responsive to this transition, the Capture component of Node 2 sends a SCHEMA message to the Apply component of Node 1, indicating that the Capture component will begin replicating changes to the database construct. Upon receiving the SCHEMA message, the Apply component transition the subscription SUB_2_1 from State I to State A (i.e., from INACTIVE to ACTIVE), indicating that the Apply components will expected replicated changes from Node 1. Once the subscription state transition is complete, the initialization process is complete and the method 400 ends.

Figure 5:
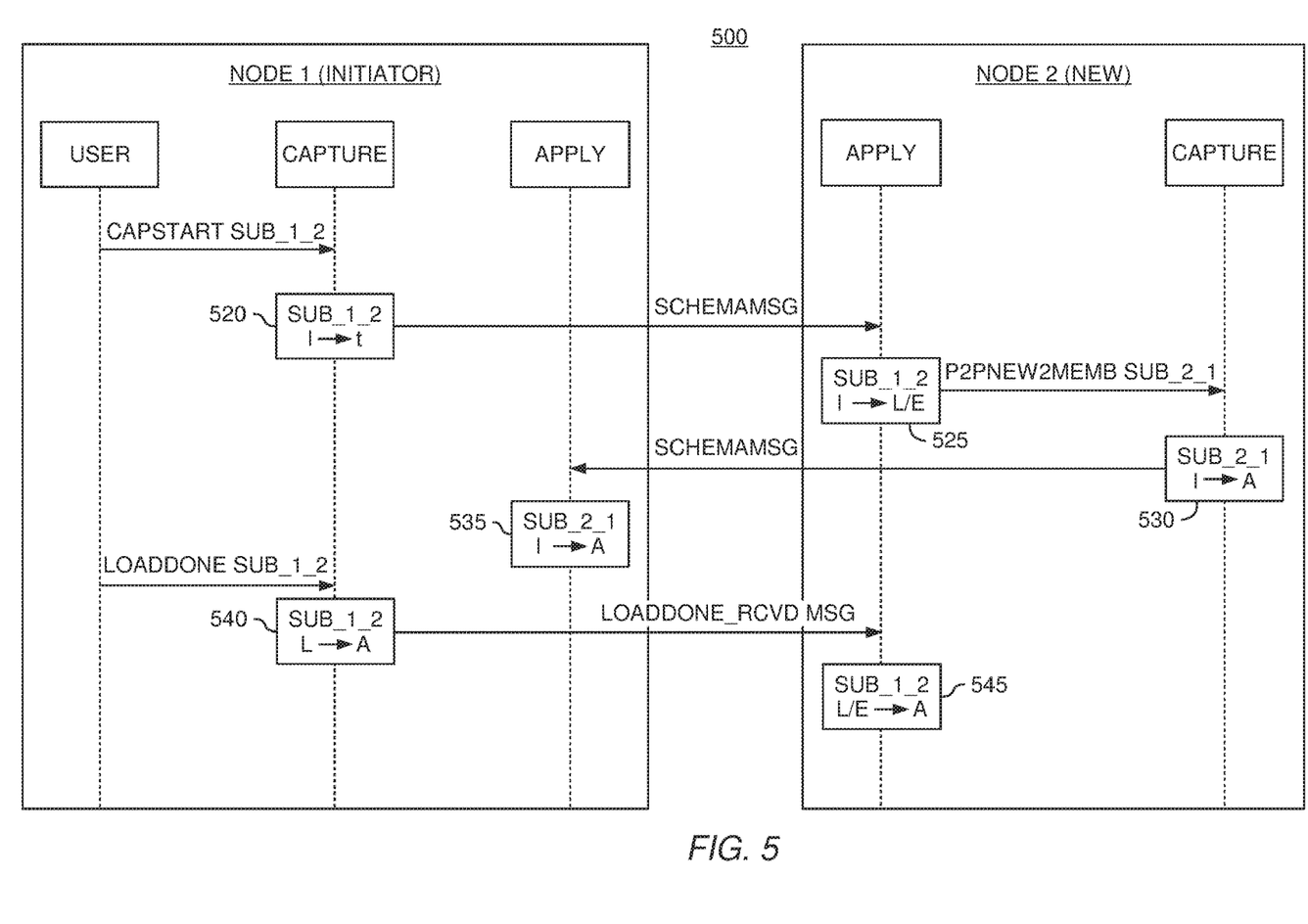
FIG. 5 is a flowchart illustrating a method for initializing a member of an asynchronous data replication group in a database system, according to one embodiment of the present invention.

As described above, embodiments of the invention provide a peer-to-peer replication protocol which does not cause any application or replication interruption when a new member is added to the replication group. FIG. 5 is a flowchart illustrating a method of initializing a member of an asynchronous data replication group in a database system, according to one embodiment of the invention. As shown, the method 500 begins at step 520, where a user inserts a CAPSTART string into a row in a table monitored by the Capture component of Node 1. The CAPSTART string indicates that a subscription to the replication group for a particular table should be started for the new Node 2. Upon detecting the CAPSTART string, the Capture component on Node 1 sends a SCHEMA control message to the Apply component of Node 2. Additionally, as shown, the Capture component of Node 1 also transitions the state of the subscription from State I to State L (i.e., from INACTIVE to LOADING). Furthermore, after sending the SCHEMA message, the Capture component of Node 1 may immediately begin replicating changes in the particular table to the Apply component of Node 2, even before any acknowledgement is received form Node 2.

Upon receiving the SCHEMA message, the Apply component of Node 2 sends a message to the Capture component of Node 2, indicating that the copy of the particular table stored on Node 2 needs to be synchronized (step 525). Additionally, in the depicted example, the Apply component of Node 2 also changes states from State I (i.e., INACTIVE) to either State L (i.e., LOADING) or State E (i.e., LOADING BY EXTERNAL PROGRAM). In other words, the copy of the particular table may be synchronized either automatically (e.g., by receiving an updated copy of the table from the Node 1), or manually by the user (e.g., using a third party table loading utility). Furthermore, as discussed above, the Capture component of Node 1 begins replicating changes in the particular table as soon as the SCHEMA message is sent. However, in the event that Node 2 does not yet contain a synchronized copy of the particular table, the Apply component of Node 2 will place any received replicated changes to the particular table in a spill queue, until they may be applied to a synchronized copy of the particular table.

Upon receiving the message, the Capture component of Node 2 synchronizes the copy of the particular table (step 530). As discussed above, this synchronization may be performed manually (State E) or automatically (State L). Furthermore, in another embodiment of the invention, if Node 2 already contains an updated copy of the particular table, the synchronization step may be omitted. Additionally, as shown, the Capture component of Node 2 also sends a handshake SCHEMA message to the Apply component of Node 1 (step 535).

In the depicted example, the user has chosen to perform a manual load operation for the particular table. As such, when the synchronization operation has completed, the user notifies the Capture component of Node 1 by sending a LOADDONE message (step 540). Responsive to receiving the LOADDONE message from the user, the Capture component of Node 1 sends a LOADDONE_RCVD message to the Apply component of Node 2 (step 545). Upon receiving the LOADDONE_RCVD message, the Apply component of Node 2 begins processing all of the replicated changes stored in the spill queue on Node 2. When the spill queue is empty, the state of the subscription between Node 1 and Node 2 is set to active. The initialization procedure is completed when all subscriptions from an active node to the new node are active.

The method 500 is advantageous because the Capture component of Node 1 may begin replicating changes to the particular table immediately upon sending the subscription start SCHEMA message. This is advantageous because it minimizes any downtime or unavailable of user applications using the replicated database tables. That is, downtime is minimized because the Capture component of Node 1 does not begin to wait on any acknowledgements from Node 2, nor does it need to wait on the table to be synchronized on Node 2, before changes may be replicated. Furthermore, by beginning replication immediately, the method 500 replicates changes during the period where existing techniques may be "waiting" on either acknowledgements or synchronization. This is advantageous, because using existing techniques, changes that occur during this time period may otherwise not be replicated at all. Because the period of time spent waiting on acknowledgements and the period of time spent waiting on table synchronization can be lengthy, and because many business applications require high availability in their database system, such an advantage is substantial.

Figure 6:
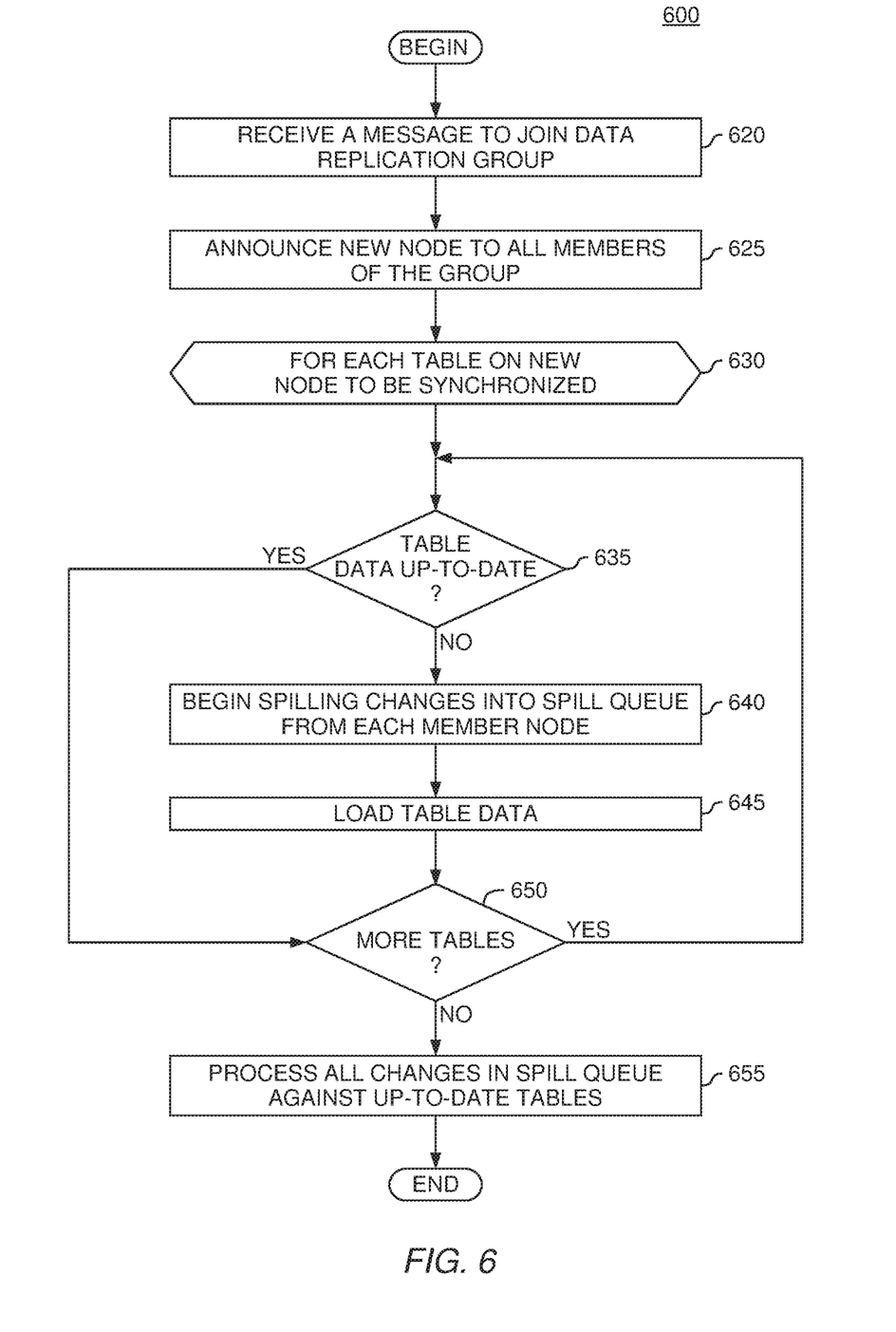
FIG. 6 is a flowchart illustrating a method for initializing a member of an asynchronous data replication group in a database system, according to one embodiment of the present invention.

FIG. 6 is a flowchart illustrating a method for initializing a member of an asynchronous data replication group in a database system, according to one embodiment of the present invention. As shown, the method 600 begins at step 620, where a target node (also referred to here as a "new node") receives a message to join an existing data replication group, from a member of the group acting as an initiator node. As discussed above, according to one embodiment of the invention, such a message may be triggered from a user inserting a CAPSTART string into a particular control table monitored by an initiator system. Upon receiving the message, the target system announces itself to all other members of the data replication group (step 625). In one embodiment, the initiator system may specify a list of all the other members of the data replication group. In such an embodiment, the new node may then communicate with the other members of the group to announce its presence and specify which database constructs on the new node should be synchronized with the rest of the replication group. The new node may communicate with the other members of the group one at a time, or may transmit a set of messages to all the group members at once.

In one embodiment of the invention, the other members of the data replication group may perform validation operations upon the announcement message from the new node. For example, the announcement message may specify that the new node wishes to receive replication changes relating to a particular database table. In such an example, the other member nodes may ensure that they currently have a synchronized instance of the specified database table. In the event that the validation operations performed by one of the other member nodes fails, the member node may transmit a message back to the new node, indicating that an error has occurred. In such a scenario, the initialization process for bringing the new node into the data replication group may halt, until the source of the error may be resolved.

Upon receiving the announcement messages from the new node, the other nodes in the data replication group may begin replicating changes to the new node immediately. Of note, the new node may receive replicated changes from all the current members of the data replication group, including the initiator node. The method 600 then enters a loop from steps 630 to 650 where the target node first determines, for each table on the new node to be synchronized, whether the table currently exists on the target node and, if so, whether the existing table is up-to-date (step 635). If the target node determines the table does not currently exist on the target node, or if the target node determines the table exists but is not currently up-to-date, the target node stores the received changes from each of the other nodes into a spill queue (step 640). The target node then performs one or more load operations to load the table data (step 645). As discussed above, examples of such a load operation include, without limitation, a request to another node in the membership group for an updated copy of the table and a manual load operation performed by a user using an external tool.

Once the table data is loaded, or if the target node determines the existing instance of the table on the target node is already up-to-date, the target node then determines whether there are more tables to be synchronized with other members of the data replication group (step 650). If the target node determines there are more database tables to be synchronized, the method 600 reverts to step 640, where the target node determines whether the next table is already up-to-date. If instead the target node determines there are no more tables to be synchronized, the target node then processes all the received replicated changes against the now up-to-date tables (step 655). Once all the changes are processed, the initialization process bringing the target node into the data replication group is complete, and the method 600 ends.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-implemented method for initializing a connection in a peer-to-peer replication environment, comprising:
   responsive to a request to add a target node to a data replication group, receiving a first message, at a target node, from an initiator node within the data replication group, indicating that the initiator node will begin replicating changes to the target node without waiting for any acknowledgements relating to the first message, wherein the changes are applied to a first instance of a data entity on the initiator node;
   upon receiving the first message indicating that the initiator node will begin replicating changes, transmitting a second message, from the target node, to at least one other member in the data replication group, announcing that the target node is joining the data replication group;
   receiving a plurality of replicated changes, at the target node, from the initiator node; and
   processing each received replicated change in the plurality of replicated changes against a second instance of the data entity at the target node.

2. The computer-implemented method of claim 1, further comprising:
   upon determining that the target node already contains a base copy of the data entity, processing each received replicated change in the plurality of replicated changes against the base copy of the data entity.

3. The computer-implemented method of claim 1, wherein the target node and the initiator node are members of a data replication group.

4. The computer-implemented method of claim 1, further comprising:
   responsive to transmitting the second message, receiving a second plurality of replicated changes, at the target node, from the other member; and upon performing a plurality of load operations, processing each received replicated change in the second plurality of replicated changes against the second instance of the data entity.

5. The computer-implemented method of claim 1, wherein the first message specifies that the data entity is a database construct to be synchronized across all members of the data replication group, and wherein the received replicated changes are associated with the database construct.

6. The computer-implemented method of claim 1, wherein the first message specifies a plurality of data entities to be synchronized between the target node and the initiator node, wherein one of the data entities to be synchronized is a database construct, and wherein the received replicated changes are applied to at least one data entity in the plurality of data entities.

7. A system, comprising:
one or more computer processors; and
a memory containing computer program code that, when executed by operation of the one or more computer processors, performs an operation for initializing a connection in a peer-to-peer replication environment, the operation comprising:
responsive to a request to add a target node to a data replication group, receiving a first message, at a target node, from an initiator node within the data replication group, indicating that the initiator node will begin replicating changes to the target node without waiting for any acknowledgements relating to the first message, wherein the changes are applied to a first instance of a data entity on the initiator node;
upon receiving the first message indicating that the initiator node will begin replicating changes, transmitting a second message, from the target node, to at least one other member in the data replication group, announcing that the target node is joining the data replication group;
receiving a plurality of replicated changes, at the target node, from the initiator node; and
processing each received replicated change in the plurality of replicated changes against a second instance of the data entity at the target node.

8. The system of claim 7, the operation further comprising:
upon determining that the target node already contains a base copy of the data entity, processing each received replicated change in the plurality of replicated changes against the base copy of the data entity.

9. The system of claim 7, wherein the target node and the initiator node are members of a data replication group.

10. The system of claim 7, the operation further comprising:
responsive to transmitting the second message, receiving a second plurality of replicated changes, at the target node, from the other member; and
upon performing a plurality of load operations, processing each received replicated change in the second plurality of replicated changes against the second instance of the data entity.

11. The system of claim 7, wherein the first message specifies that the data entity is a database construct to be synchronized across all members of the data replication group, and wherein the received replicated changes are associated with the database construct.

12. The system of claim 7, wherein the first message specifies a plurality of data entities to be synchronized between the target node and the initiator node, wherein one of the data entities to be synchronized is a database construct, and wherein the received replicated changes are applied to at least one data entity in the plurality of data entities.

13. A computer-readable storage medium containing computer program code that, when executed by operation of one or more computer processors, performs an operation for initializing a connection in a peer-to-peer replication environment, the operation comprising:
responsive to a request to add a target node to a data replication group, receiving a first message, at a target node, from an initiator node within the data replication group, indicating that the initiator node will begin replicating changes to the target node without waiting for any acknowledgements relating to the first message, wherein the changes are applied to a first instance of a data entity on the initiator node;
upon receiving the first message indicating that the initiator node will begin replicating changes, transmitting a second message, from the target node, to at least one other member in the data replication group, announcing that the target node is joining the data replication group;
receiving a plurality of replicated changes, at the target node, from the initiator node; and
processing each received replicated change in the plurality of replicated changes against a second instance of the data entity at the target node.

14. The computer-readable storage medium of claim 13, the operation further comprising:
upon determining that the target node already contains a base copy of the data entity, processing each received replicated change in the plurality of replicated changes against the base copy of the data entity.

15. The computer-readable storage medium of claim 13, wherein the target node and the initiator node are members of a data replication group.

16. The computer-readable storage medium of claim 13, the operation further comprising:
responsive to transmitting the second message, receiving a second plurality of replicated changes, at the target node, from the other member; and
upon performing a plurality of load operations, processing each received replicated change in the second plurality of replicated changes against the second instance of the data entity.

17. The computer-readable storage medium of claim 13, wherein the first message specifies that the data entity is a database construct to be synchronized across all members of the data replication group, and wherein the received replicated changes are associated with the database construct.

18. The computer-readable storage medium of claim 13, wherein the first message specifies a plurality of data entities to be synchronized between the target node and the initiator node, wherein one of the data entities to be synchronized is a database construct, and wherein the received replicated changes are applied to at least one data entity in the plurality of data entities.

* * * * *